No. 823,640. PATENTED JUNE 19, 1906.
A. SCHULZE.
TOOL SHANK.
APPLICATION FILED DEC. 6, 1905.
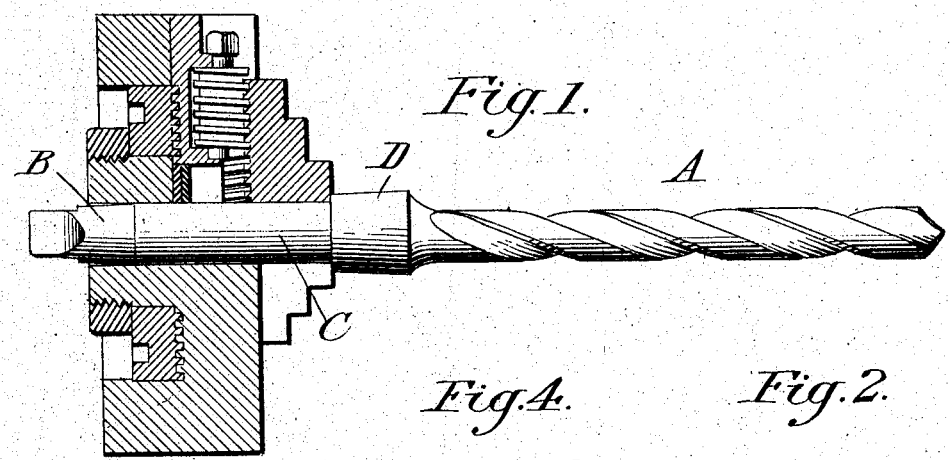
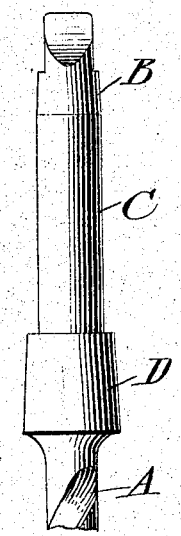
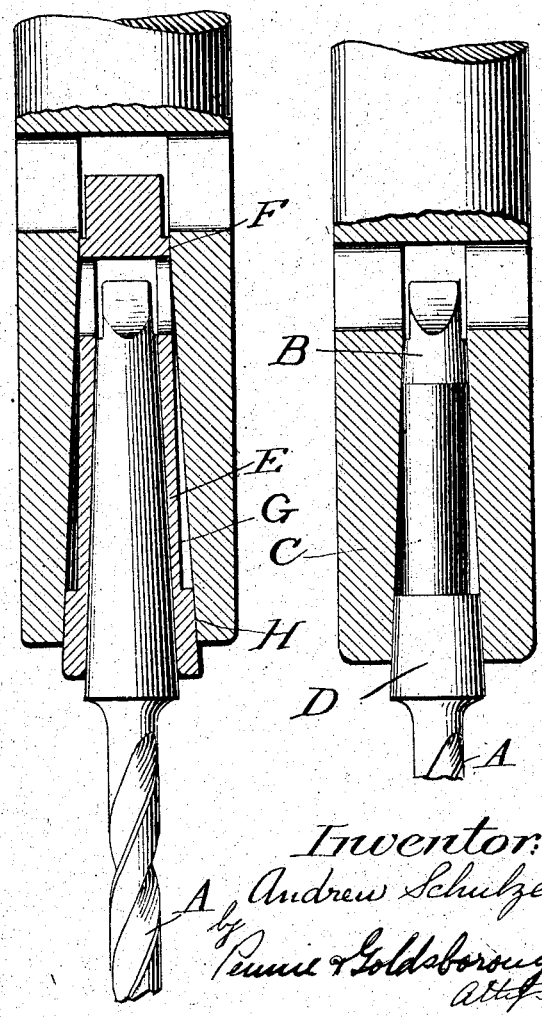
Witnesses:
Inventor:
Andrew Schulze
by Pennie & Goldsborough
Attys.

UNITED STATES PATENT OFFICE.

ANDREW SCHULZE, OF WASHINGTON, DISTRICT OF COLUMBIA, ASSIGNOR OF ONE-HALF TO JOHN C. PENNIE, OF WASHINGTON, DISTRICT OF COLUMBIA.

TOOL-SHANK.

No. 823,640.      Specification of Letters Patent.      Patented June 19, 1906.

Application filed December 6, 1905. Serial No. 290,616.

*To all whom it may concern:*

Be it known that I, ANDREW SCHULZE, a citizen of the United States, residing in the city of Washington, District of Columbia, have invented certain new and useful Improvements in Tool-Shanks; and I do hereby declare the following to be a full, clear, and exact description of the invention, such as will enable others skilled in the art to which it appertains to make and use the same.

This invention relates to that portion of a drill, bit, screw-driver, or other tool by which the tool is secured in operative position, which portion is generally known as the "shank" of the tool.

The chucks of lathes, the spindles of drill-presses, and other tool-holding means are built in different forms, and each form requires a corresponding shape of tool-shank to fit it.

It is the object of the present invention to provide means whereby a tool may be secured in any one of a number of tool-holders of different forms.

It is contemplated that the invention will find its widest use in connection with bits or drills, and it is therefore illustrated in a device of that character. It is the practice among machinists to so construct the holding means for drills or bits as to adapt them to receive either a tapered or a cylindrical shank, and it has heretofore been the practice to provide a tool with a tapered shank for use in one machine and a tool with a cylindrical shank for use in the other.

In the accompanying drawings is shown a drill provided with means for securing it in holders which are respectively adapted to tapering and cylindrical shanks.

Of the drawings, Figure 1 is a side view of a drill having a shank embodying the invention secured in a chuck which is shown in section, the chuck being adapted to receive a cylindrical shank. Fig. 2 is a side view of the drill, partly broken away, secured in a drill-spindle adapted to a tapered shank, the spindle being shown in section. Fig. 3 is a view of the shank end of a drill embodying the invention; and Fig. 4 is a side view of an ordinary tapering shank-drill, partly broken away, with means for adapting the shank to a plurality of holders, the whole being secured in a spindle adapted to receive a tapered shank, the spindle and adapting means being shown in section.

Referring to Figs. 1, 2, and 3 of the drawings, the drill comprises the usual twisted portion A and the shank having the holder-engaging surfaces B C D. The surface C is cylindrical, and the tapering surfaces B and D are located each at one end of the surface C and are in the same surface of revolution generated by a straight line. The manner of securing the drill in Fig. 1 is evident from the drawings, as is also that in relation to the device shown in Fig. 2.

Referring to Fig. 4, the shank proper of the drill is shown as being of the ordinary tapered kind and is secured within the drill-spindle through the instrumentality of a sleeve E, upon the outside of which is provided a plurality of holder-engaging surfaces F, G, and H, similar to the surfaces B, C, and D upon the shank proper of the tool shown in Figs. 1, 2, and 3.) This sleeve provides a means for adapting the shank proper of the tool to either a cylindrical or tapered opening in a holding means, and it will be observed that by this arrangement a tool-shank may be adapted to be used in a holder different from that to which it was primarily intended to be applied. The sleeve E on being secured to the shank proper of the tool becomes, in effect, a part thereof, and the tool, with its attached sleeve, may be manipulated in precisely the same manner as if the sleeve were an integral part of the shank. The sleeve, together with the shank proper, in the practical operation of the tool forms the shank of the tool.

So far as I am aware, the two outer tapering surfaces, together with the intermediate non-tapering surface, are features which are broadly new, whether applied to a shank rigid with the tool or to a sleeve separable from the shank proper. It will therefore be understood that in claims 1, 2, and 3 the words "means for engaging holder-sockets of different forms" are used generically to designate both the modification shown in Fig. 4 and that shown in the remaining figures. Claim 4 is specific to the removable sleeve having the surfaces referred to.

While the invention has been illustrated in what is considered its most useful embodiment, various structures may be employed without departing from the spirit of the invention, and it should not, therefore, be limited to the structures shown.

What I claim, and desire to secure by Letters Patent of the United States, is—

1. A tool having means for engaging holder-sockets of different forms, including two taper sections of substantially equal inclination, and an intermediate section the surface of which is substantially parallel to the axis of the holder-socket.

2. A tool having means for engaging holder-sockets of different forms, including two taper surfaces lying in the same surface of revolution, and an intermediate cylindrical surface.

3. A tool having means for engaging holder-sockets of different forms, including two surfaces tapering at the same angle, and an intermediate cylindrical surface.

4. Means for engaging a tool with holder-sockets of different forms, said means consisting of a separable sleeve forming a rigid part of the tool when in use and including two tapering surfaces, and an intermediate non-tapering surface.

In testimony whereof I affix my signature in presence of two witnesses.

ANDREW SCHULZE.

Witnesses:
J. E. HUTCHINSON, Jr.,
GEO. W. REA.